(12) United States Patent
Isberg et al.

(10) Patent No.: US 11,645,777 B2
(45) Date of Patent: May 9, 2023

(54) MULTI-VIEW POSITIONING USING REFLECTIONS

(71) Applicant: SONY CORPORATION, Tokyo (JP)

(72) Inventors: Anders Isberg, Åkarp (SE); Andrej Petef, Lund (SE); Olivier Moliner, Lund (SE); Sangxia Huang, Malmö (SE)

(73) Assignee: Sony Group Corporation

( * ) Notice: Subject to any disclaimer, the term of this patent is extended or adjusted under 35 U.S.C. 154(b) by 190 days.

(21) Appl. No.: 17/193,024

(22) Filed: Mar. 5, 2021

(65) Prior Publication Data

US 2021/0304435 A1 Sep. 30, 2021

(30) Foreign Application Priority Data

Mar. 26, 2020 (SE) .................................. 2050332-2

(51) Int. Cl.
*G06T 7/73* (2017.01)
*G06T 3/60* (2006.01)
(Continued)

(52) U.S. Cl.
CPC .............. *G06T 7/73* (2017.01); *G06F 18/23* (2023.01); *G06T 3/60* (2013.01); *G06T 7/74* (2017.01); *G06V 20/647* (2022.01); *G06T 2207/30196* (2013.01)

(58) Field of Classification Search
CPC ...... G06V 20/588; G06V 10/44; G06V 20/20; G06V 20/64; G06V 40/16; G06V 20/46;
(Continued)

(56) References Cited

U.S. PATENT DOCUMENTS 8,306,260 B2 11/2012 Zhu
2017/0038728 A1 2/2017 Zschau
(Continued)

FOREIGN PATENT DOCUMENTS

CN 110020611 A 7/2019
EP 3115741 A1 1/2017
(Continued)

OTHER PUBLICATIONS

X. Xiang, E. Bai, W. Xu, Z. Yan and D. Xiao, "3D target detection and tracking based on scene flow," 2016 IEEE International Conference on Electronic Information and Communication Technology (ICEICT), 2016, pp. 240-243, doi: 10.1109/ICEICT.2016.7879692. (Year: 2016).*

(Continued)

*Primary Examiner* — Amandeep Saini
(74) *Attorney, Agent, or Firm* — Tucker Ellis LLP

(57) ABSTRACT

A device determines the positioning of objects in a scene by implementing a robust and deterministic method. The device obtains object detection data (ODD) which identifies the objects and locations of reference points of the objects in views of the scene. The obtained ODD is processed to identify a first image object of a first view as a mirror reflection of a real object. A virtual view associated with a virtual camera position is created, including the ODD associated with the first image object of the first view. The ODD associated with the first image object is removed from the first view. Based on the ODD associated with at least said virtual view and a further view of the one or more views, a position of said first image object is computed.

18 Claims, 10 Drawing Sheets

(51) Int. Cl.
   *G06V 20/64* (2022.01)
   *G06F 18/23* (2023.01)
(58) Field of Classification Search
   CPC ...... G06V 40/172; G06V 20/44; G06V 40/20;
     G06V 20/647; G06T 7/11; G06T 1/0014;
     G06T 7/70; G06T 7/20; G06T
     2207/30196; G06T 2207/10016; G06T
     2207/30201; G06T 7/74; G06T 3/60;
     G06T 7/00; G05B 19/4061; H04N 7/185;
     H04N 7/188; G08B 21/22; G06K 9/6218
   See application file for complete search history.

(56) References Cited

U.S. PATENT DOCUMENTS

| | | | |
|---|---|---|---|
| 2017/0041592 A1* | 2/2017 | Hwang | ............... G06T 7/74 |
| 2017/0020669 A1 | 7/2017 | Harrises | |
| 2018/0268246 A1 | 9/2018 | Kondo | |
| 2020/0021752 A1* | 1/2020 | Holzer | ............ H04N 13/282 |

FOREIGN PATENT DOCUMENTS

| | | | |
|---|---|---|---|
| WO | 2019230205 A1 | | 12/2019 |
| WO | WO-2019230205 A1 * | | 12/2019 |

OTHER PUBLICATIONS

Swedish Office Action with Swedish Search Report from corresponding Swedish Application No. 2050332-2, dated Dec. 14, 2020, 8 pages.
Criminisi, A., et al., "Extracting layers and analyzing their specular properties using epipolar-plane-image analysis," Computer Vision and Image Understanding 97 (2005) 51-85, Aug. 7, 2004, 35 pages.
Havasi, L., et al.,"The Use of Vanishing Point for the Classification of Reflections From Foreground Mask in Videos," IEEE Transactions on Image Processing, vol. 18, No. 6, Jun. 2009, 7 pages.
Havasi, L. et al., "Use of Motion Statistics for Vanishing Point Estimation in Camera-Mirror Scenes", Image Processing, 2006 IEEE International Conference on Image Processing, Oct. 1, 2006, 4 pages.
Sun, Ke, et al., "Deep High-Resolution Representation Learning for Human Pose Estimation," arXiv:1902.09212v1 [cs.CV], Feb. 25, 2019, 12 pages.
Tuytelaars, Tinne, at al., "Local Invariant Feature Detectors: A Survey," Foundations and Trends in Computer Graphics and Vision, vol. 3, No. 3, pp. 177-280, dated 2007.
Xiao, Bin, et al., "Simple Baselines for Human Pose Estimation and Tracking," arXiv:1804.06208v2 [cs.CV], Aug. 21, 2018, 16 pages.
The Extended European Search Report from corresponding European Application No. 21156122.0, dated Jul. 15, 2021, 4 pages.

* cited by examiner

| VIEW# | OBJECT# | KEYPOINT LOC |
|---|---|---|
| 1 | 1 | L1, L2, ..., L14 |
| 1 | 2 | L1, L2, ..., L14 |
| 1 | 3 | L1, L2, ..., L14 |
| 2 | 1 | L1, L2, ..., L14 |
| 2 | 2 | L1, L2, ..., L14 |
| 2 | 3 | L1, L2, ..., L14 |
| 3 | 1 | L1, L2, ..., L14 |
| 3 | 2 | L1, L2, ..., L14 |
| 3 | 3 | L1, L2, ..., L14 |

← ODD

MULTI-VIEW POSITIONING USING REFLECTIONS

RELATED APPLICATION DATA

This application claims the benefit of Swedish Patent Application No. 2050332-2, filed Mar. 26, 2020, the disclosure of which is incorporated herein by reference in its entirety.

TECHNICAL FIELD

The present disclosure relates generally to image processing for 3D (3-dimensional) object recognition and positioning and, in particular, to such image processing based on image data representing multiple views of a scene comprising a mirror.

BACKGROUND

Recovering the 3D position and the 3D pose of objects from images has been a long-standing problem in computer vision, where the objects may include inanimate objects or living organisms, or both. Techniques for 3D positioning and pose determination have a variety of applications such as 3D vision inspection, product assembly, goods inspection, human-computer interaction, video surveillance, sports broadcasting, industry robot control, navigation, etc.

One common solution is to use multiple cameras with overlapping fields of view, where the position and orientation of the cameras is known with reasonable accuracy, for example by measurement during installation. In operation, 3D positioning and pose determination typically comprises two stages: processing of individual video streams from the multiple cameras for detection of objects and keypoints of the respective object, and processing the detections to identify correspondence between detections of the same object in different views and calculating the position and/or pose of the respective object based on the correspondence between detections, and optionally temporal information. There are several established techniques for performing the first stage with good performance, for example by use of convolutional neural networks. However, the second stage poses a major challenge, i.e. to find cross-view correspondences between detected keypoints and objects. For example, crowding and occlusion of objects, as well as presence of noise, in the image data may make this task difficult.

Existing techniques for 3D positioning and pose determination have a number of shortcomings. Some problems in the art are related to issue of properly identifying and positioning different objects in a scene comprising one or more mirrors, or highly reflective surfaces that act like mirrors. Such a scene may e.g. be a room in which one or more walls are provided with mirrors. The camera system will detect mirrored objects that come from reflections in the mirrors which may confuse a positioning system. The reflections will in worst case decrease the accuracy of the system and can cause the system to create models with faulty knowledge about the spatial dimensions of the sensed scene or area.

U.S. Pat. No. 8,306,260B2 discloses a system for 3D monitoring of test subjects. The system comprises an actual camera, at least one virtual camera, a computer connected to the actual camera and the computer is preferably installed with software capable of capturing the stereo images associated with the 3-D motion-related behavior of test subjects as well as processing these acquired image frames for the 3-D motion parameters of the subjects. The proposed solution involves arranging the room and the mirrors in a way such that the direct view and reflected view have minimal overlap in the camera view finder. For a lab environment this is acceptable but in real world setups, such as in a room with mirrors on the wall, it poses a big restriction if not impossible.

There is a need for a more robust and widely applicable technique for 3D positioning and pose determination of objects in a scene comprising a reflecting surface acting as a mirror.

SUMMARY

It is an objective to at least partly overcome one or more limitations of the prior art.

Another objective is to provide a technique for determining a 3D position and/or 3D pose of one or more objects in a scene comprising a reflecting surface acting as a mirror, based on image data representing different views of the scene.

One or more of these objectives, as well as further objectives that may appear from the description below, are at least partly achieved by a method, a computer-readable medium, a monitoring device, and a monitoring system according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figures 1A, 1B:
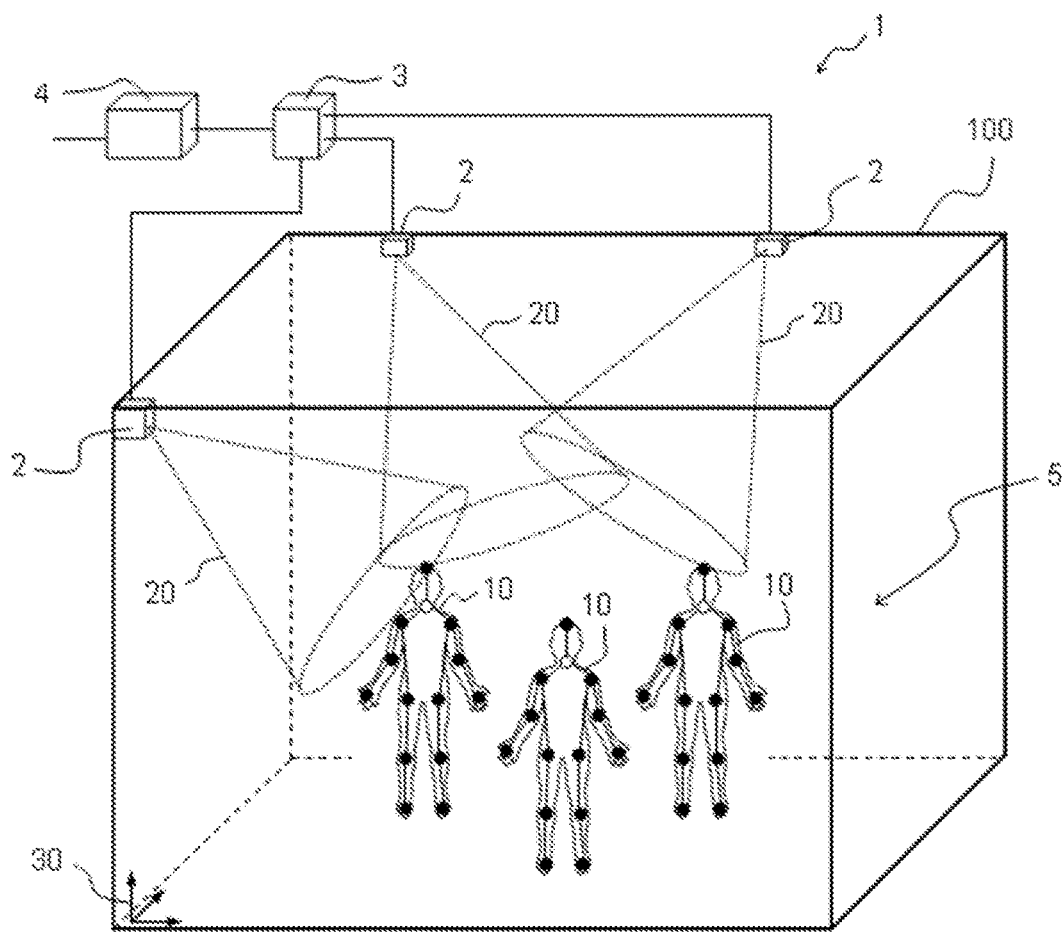
FIG. 1A is a perspective view of an installation of a monitoring system in a room, FIG. 1B exemplifies object detection data (ODD) generated in the system, FIG. 1C exemplifies keypoints detected for a human object.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numbers refer to like elements throughout.

Before describing embodiments in more detail, a few definitions will be given.

As used herein, "scene" denotes a three-dimensional (3D) space that is collectively monitored by two or more imaging devices. The imaging devices have at least partly overlapping fields of views. The respective imaging device may be configured to produce digital still images or a digital video stream, i.e. a coherent time-sequence of digital images. The respective image is a two-dimensional (2D) representation of the scene, or part thereof, as seen by the imaging device. The imaging device may comprise imaging optics, a digital image sensor responsive to electromagnetic radiation, and control electronics for acquiring signals from the digital image sensor and generating a digital image, which may be monochromatic or polychromatic. The respective imaging device may be responsive to electromagnetic radiation in any wavelength range, including but not limited to ultraviolet, visible or infrared radiation, or any part or combination thereof.

As used herein, "field of view" has its conventional meaning and denotes the extent of the scene that is observed by the respective imaging device at any given moment and may be defined as a solid angle through which the imaging device is sensitive to the electromagnetic radiation.

As used herein, "keypoint" has its conventional meaning in the field of computer vision and is also known as an interest point. A keypoint is a spatial location or point in an image that define what is interesting or what stand out in the image and may be defined to be invariant to image rotation, shrinkage, translation, distortion, etc. More generally, a keypoint may be denoted a "reference point" on an object to be detected in the image, with the reference point having a predefined placement on the object. Keypoints may be defined for a specific type of object, for example a human body, a part of the human body, or an inanimate object with a known structure or configuration. In the example of a human body, keypoints may identify one or more joints and/or extremities. Keypoints may be detected by use of any existing feature detection algorithm(s), for example image processing techniques that are operable to detect one or more of edges, corners, blobs, ridges, etc. in digital images. Non-limiting examples of feature detection algorithms comprise SIFT (Scale-Invariant Feature Transform), SURF (Speeded Up Robust Feature), FAST (Features from Accelerated Segment Test), SUSAN (Smallest Univalue Segment Assimilating Nucleus), Harris affine region detector, and ORB (Oriented FAST and Rotated BRIEF). Further information about conventional keypoint detectors is found in the article "Local invariant feature detectors: a survey", by Tuytelaars et al, published in Found. Trends. Comput. Graph. Vis. 3(3), 177-280 (2007). Further examples of feature detection algorithms are found in the articles "Simple Baselines for Human Pose Estimation and Tracking", by Xiao et al, published at ECCV 2018, and "Deep High-Resolution Representation Learning for Human Pose Estimation", by Sun et al, published at CVPR 2019. Correspondingly, objects may be detected in images by use of any existing object detection algorithm(s). Non-limiting examples include various machine learning-based approaches or deep learning-based approaches, such as Viola-Jones object detection framework, SIFT, HOG (Histogram of Oriented Gradients), Region Proposals (RCNN, Fast-RCNN, Faster-RCNN), SSD (Single Shot MultiBox Detector), You Only Look Once (YOLO, YOLO9000, YOLOv3), and RefineDet (Single-Shot Refinement Neural Network for Object Detection).

Embodiments are related to determining positioning of one or more objects in a scene based on a plurality of views of the scene, also known as a "multiview". The positioning may be 3D object positioning, which involves determining a single 3D position of a keypoint of the respective object in the scene, or 3D pose determination, which involves determining 3D positions of a plurality of keypoints of the respective object in the scene. The views may be digital images and may be produced by a fixed or non-fixed arrangement of imaging devices. The views represent different viewpoints onto the scene, or parts thereof, and the respective object is reproduced as a two-dimensional object in the respective view.

One technical challenge in this context occurs in scenarios where the scene comprises a mirror which causes reflections. In the context of this disclosure, it shall be noted that a mirror in a scene need not be a surface configured to act as a mirror, but any highly reflective surface that causes reflections of other objects to be seen in the reflective surface, such as a window in certain light conditions. Examples of such a scene may be a gym or a dance hall, which may be equipped with one or several mirrors along the walls. The mirrors generate reflections which cause several issues in the positioning of objects in the scene. A related challenge in this context is to handle occlusions in which an object is partially hidden in one or more views, for example behind another object, and/or crowding in which objects are in close vicinity to each other in one or more views. Another challenge may be to perform the positioning in a processing efficient way to save computing resources and, possibly, to enable real-time processing. Such real-time processing may, for example, enable real-time tracking of objects and 3D positions based on video streams from the imaging devices.

A method and system is provided herein comprising one or more imaging devices, also referred to herein as cameras. The system may be referred to as a multi camera system. The cameras may be mounted so their fields of view will cover the entire area that shall be sensed. To get good accuracy the cameras are configured to overlap, i.e. having fields of view which overlap, so that the cameras will get multiple views of the object that is being positioned or tracked. In the sensed area there is one or more mirrors causing reflections. The position and orientation of each camera with respect to the scene is known to the system. Moreover, the position, the approximate size and shape, and orientation of each mirror in the scene is known. Position and orientation data may be stored in a data storage, connected to the system.

Figure 1C:
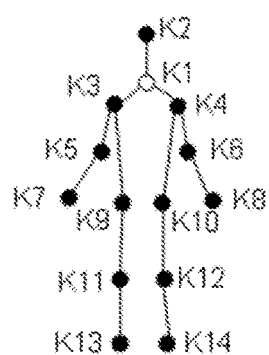
FIG. 1D illustrates a view of one of the cameras in the system onto the scene.
FIG. 1E illustrates a view of one camera in the system onto the scene comprising a mirror.
FIG. 1F illustrates image objects detected by the camera in the scene of FIG. 1E, including a mirror reflection.
FIG. 1G illustrates a view of from above and FIG. 1H illustrates a view from the side, of a scene covered by cameras, including a virtual image detected by mirror reflection and a virtual camera created associated with the mirror image.
FIG. 1I shows a flow chart of a method in accordance with an embodiment.
Figure 1D:
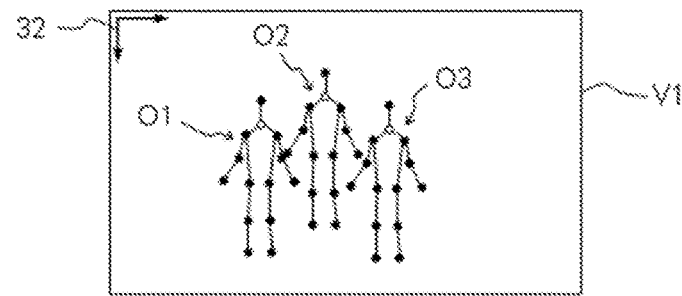
Figure 1E:
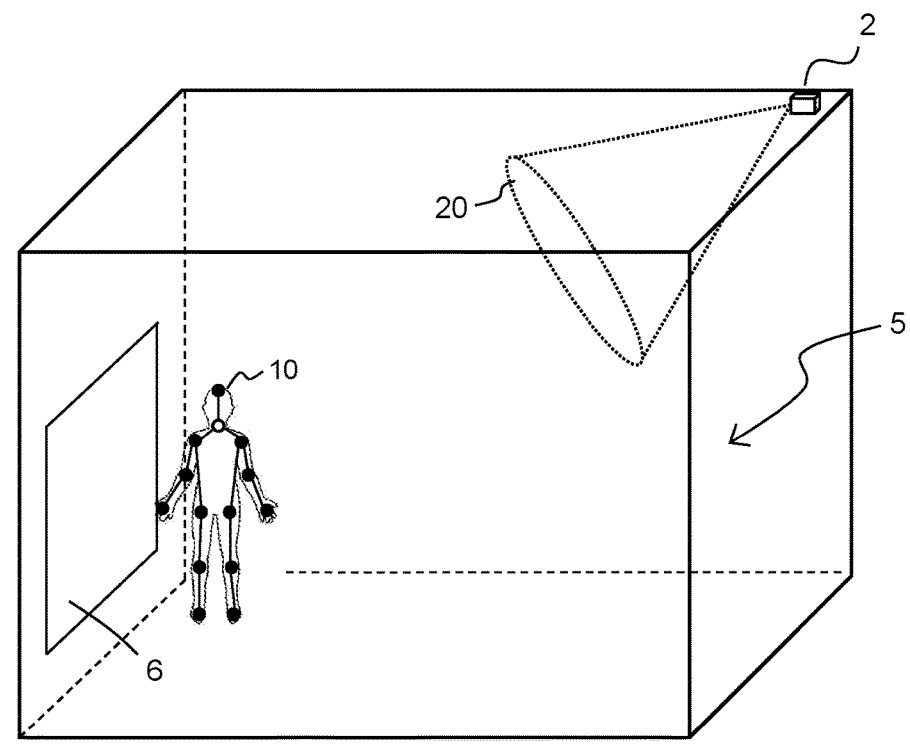
Figure 1F:
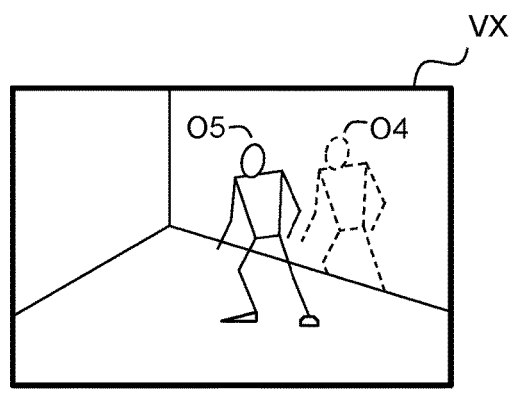
Figure 1G:
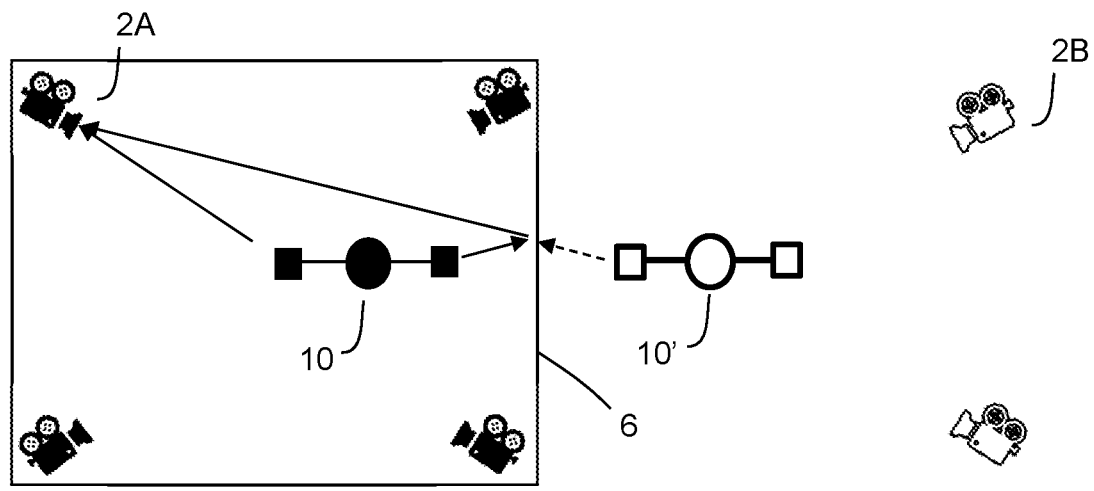
Figure 1H:
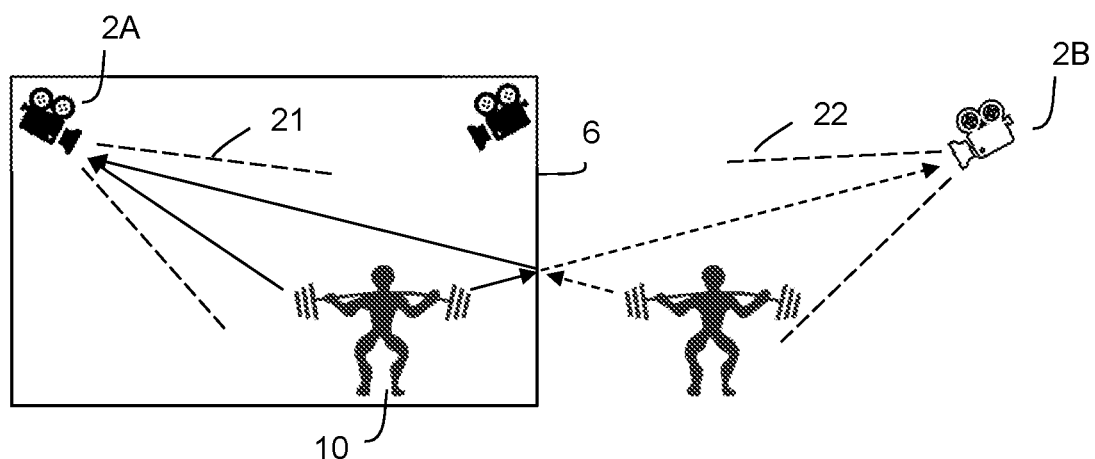
Figure 1I:
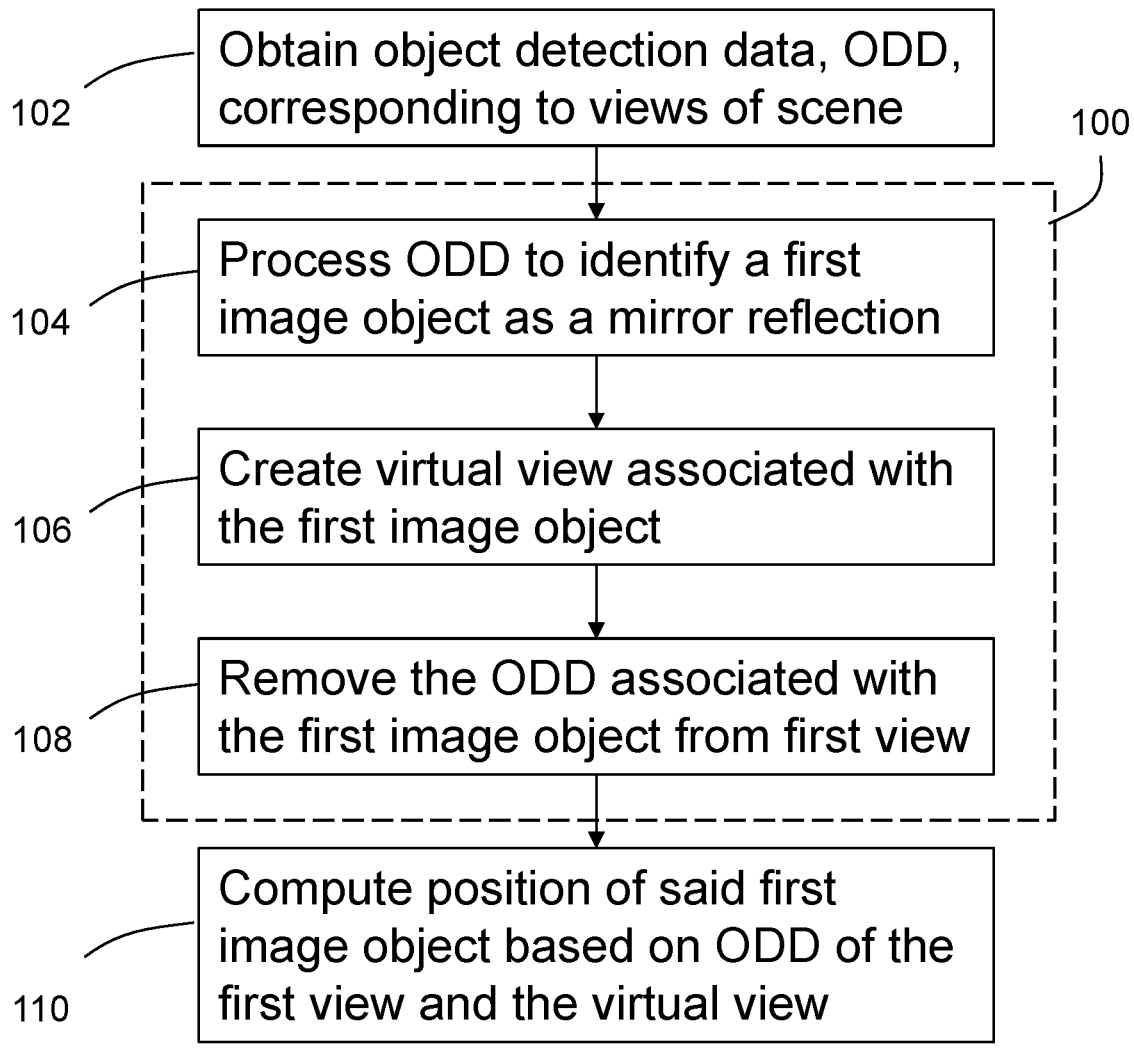

On a general level, and as illustrated in FIG. 1I, a method of determining positioning of objects in a scene based on a plurality of views is provided. The method comprises:
obtaining 102 object detection data, ODD, corresponding to one or more views of the plurality of views of the scene, wherein each of the one or more views is captured by a respective camera, said ODD comprising an object identifier of a respective image object in a respective view and a location of a respective reference point of the respective image object in the respective view;
processing 104 the obtained ODD to identify a first image object of a first view of said one or more views as a mirror reflection of a real object;
creating 106 a virtual view associated with a virtual camera position, with ODD corresponding to said virtual view comprising a data part of the ODD corresponding to the first view, which data part is associated with the identified first image object;
removing 108 said data part of the ODD associated with the first image object from the first view; and
computing 110, based on the ODD associated with at least said virtual view and a further view of the one or more views, a position of said first image object.

Various aspects and implementation alternatives related to this method are described below. The further view may be the first view, or another real view of the one or more views, captured by another camera. Alternatively, the further view may be another created virtual view. Where the further view is also a created virtual view, it may be created based on a data part of the ODD of the same first view based on another mirror reflection in another mirror, or be created based on a data part of the ODD of another one of the one or more views based on a mirror reflection in the same mirror or another mirror surface.

Prior to, or during, creation of a virtual view, object detection may be running without considering virtual camera(s), i.e. the object detection will use the streams from the real cameras. This is described and exemplified below with reference to at least FIGS. 1A-1E, which also describe process steps included in step 102 in various embodiments.

FIG. 1A shows an example arrangement of a monitoring system 1 in accordance with an embodiment. The system 1 is arranged to monitor a scene 5 in a room 100. In the illustrated example, three individuals 10 are in the room 100. The system 1 comprises a plurality of imaging devices 2, for example digital cameras, which are oriented with their respective field of view 20 towards the scene 5. The scene 5 is associated with a fixed 3D coordinate system 30 ("scene coordinate system"). The imaging devices 2 may be fixed or moveable, and their relative positions and orientations are known for each image taken. The imaging devices 2 may be synchronized to capture a respective image at approximately the same time, or at least with a maximum time difference which depends on the expected maximum speed of movement of the objects 10. In one example, a maximum time difference of 0.1-0.5 seconds may provide sufficient accuracy for normal human motion.

The images captured by the imaging devices 2 are received by a detection device 3, which is configured to determine one or more keypoints of one or more objects in the respective image. The detection device 3 may implement any conventional object detection technique for identifying objects of a generic or specific type in the respective image and may implement any conventional feature detection technique for identifying one or more keypoints of the respective object, for example any of the feature and object detection techniques mentioned hereinabove. The detection device may also pre-process the incoming images, for example for noise reduction, contrast enhancement, etc. In an alternative configuration, the monitoring system 1 comprises a plurality of detection devices 3, for example one for each imaging device 2, where the detection devices 3 may be co-located or integrated with the imaging devices 2.

The detection device 3 produces object detection data, which identifies one or more keypoints of one or more objects detected in the respective image. The object detection data is denoted ODD in the following. An example of the ODD is shown in FIG. 1B. Although FIG. 1B illustrates a table, the ODD may be given in any format. In the illustrated example, the ODD represents each image (view) by a respective view identifier (1-3 in FIG. 1B) and each object by a respective object identifier (1-3 in FIG. 1i), and comprises a keypoint position for each keypoint detected for the respective object (L1-L14 in FIG. 1i). In the following, for clarity of presentation, object identifiers will be designated O1, O2, O3, etc., and view identifiers will be designated V1, V2, V3, etc. An example of keypoints K1-K14 that may be detected for a human individual is shown in FIG. 1C. However, any number of keypoints may be detected depending on implementation. One or more of the keypoints may be designated as a main keypoint. The main keypoint may be identifiable with greater accuracy than other key points and/or may have a specific location within the object, for example close to its center. In the schematic example of FIG. 1C, the main keypoint K1 is indicated by an open circle and corresponds to the neck of the respective individual.

The detection device 3 is configured to detect a predefined number of keypoints of the respective object. If a keypoint is not detected, the detection device 3 may enter a predefined value (for example, a null value) into the ODD. The detection device 3 may also include a confidence score for each object and/or keypoint in the ODD, the confidence score representing a level of certainty for the respective detection. FIG. 1D shows an example view V1 captured by one of the imaging devices 2 in FIG. 1A and represents three detected objects O1, O2 and O3 with associated keypoints. The detected position of the respective keypoint is given by 2D coordinates in a local and fixed coordinate system 32 of the view V1.

The system 1 further comprises a positioning device 4, which is configured to operate on the ODD to compute, and possibly track over time, one or more 3D positions of one or more objects in the scene 5. It may be noted that positioning device 4 may comprise a plurality of units, which may be co-located with respective detection devices, wherein calculating 3D positioning is distributed. For example, a first positioning device 4A and detection device 3A are co-located and configured to track a human M, whilst a second positioning device 4B and detection device 3B are co-located and configured to track a human N. Embodiments of the positioning device 4 and the processing therein will be described in detail further below.

During the process of obtaining object detection data, some of the mirror reflections will be detected. FIG. 1E schematically illustrates an imaging device 2 oriented with its field of view 20 towards and object 10 and a mirror 6. In this scenario, object detection data originating from the object 10 and/or of other objects may be obtained in the imaging device 2, after reflection in the mirror 6. The output from this occurrence will be a list of detections from the imaging device 2, as provided in and described with reference to FIG. 1B. As illustrated in FIG. 1F, showing the image detected by the imaging device 2 of FIG. 1E, object detection data associated with a first image object O4 may be detected, originating from the real object 10 and subsequently reflected in (at least) the mirror 6. Additionally, object detection data associated with a second image object O5 may be detected, originating directly from the real object 10.

Next step 104 is to detect which detections are reflections. This involves processing the obtained ODD to identify a first image object as a mirror reflection of the real object 10. This step may be carried out using one or more algorithms of processing the object detection data of one or more views. One embodiment makes use of the algorithm and network solution proposed and presented in detail in the document "Where Is My Mirror?" by Yang et al, submitted on 24 Aug. 2019 and published by Cornell University under Computer Science>Computer Vision and Pattern Recognition as arXiv:1908.09101, and also published at The IEEE International Conference on Computer Vision in October 2019. The solution outlined therein provides a large-scale mirror dataset, which consists of 4; 018 images containing mirrors and their corresponding manually annotated mirror masks, taken from diverse daily life scenes. A feature extraction network (FEN) incorporates a contextual contrasted feature extraction (CCFE) module for mirror segmentation, by learning to model the contextual contrast inside and outside of the mirrors. Given features extracted by the FEN, the CCFE produces multi-scale contextual contrasted features for detecting mirrors of different sizes. To effectively detect mirror boundaries (where contents may change significantly), a CCFE block is designed to learn contextual contrasted features between a local region and its surrounding, as:

$$CCF = f_{local}(F, \theta_{local}) - f_{context}(F, \theta_{context})$$

where F is the input features, $f_{local}$ represents a local convolution with a 3×3 kernel (dilation rate=1), $f_{context}$ represents a context convolution with a 3×3 kernel (dilation rate=x), and $\theta_{local}$ and $\theta_{context}$ are parameters. CCF is the desired contextual contrasted features. The method further proposes to learn multi-scale contextual contrasted features to avoid the ambiguities caused by nearby real objects and their reflections in the mirror, by considering non-local contextual contrast. Hence, the dilation rate x is set to 2, 4, 8, and 16, such that long-range spatial contextual contrast can be obtained. The multi-scale contextual contrasted features are then concatenated and refined via an attention module to produce feature maps that highlight the dividing boundaries. Further details and experimental results are outlined in the document, which is herein incorporated by reference.

In the context of the presently proposed method and system, in which the position and orientation of the mirror (s) 6 in a scene are known beforehand, the identification of which object detection data is obtained from a mirror reflection, e.g. using the just cited document, can be made with an even better confidence.

Another process usable for identifying which detections are reflections includes carrying out appearance detection and correlation of object detection data of two or more detections in a common image sequence, such as a video stream or a number of time stamped still images from a camera 2. That is, if two detections, i.e. image objects O4 and O5 or a keypoint of O4 and a keypoint of O5, have a similar appearance, then they are likely image objects of the same real object 10. In some embodiments, this process is used in combination with the process described in the reference document, to increase the confidence level of determination that an image object O4 is a mirror reflection. In one embodiment, appearance may include spatial-temporal action characteristics, and identification of movement with similar rhythm, within some tolerance level, is used to identify a related image object with its virtual mirror image In yet another embodiment, appearance may include color characteristics, and a process of comparing ODD identifying color-related features of detected objects or keypoints may be used to identify a related image object with its virtual mirror image.

For those detections that are determined to be reflections, the knowledge of the position of the mirror(s) 6 of the scene is used to decide which mirror is reflecting the object. This way, a virtual view is created in step 106, associated with a virtual camera position, comprising the object detection data associated with the first image object. FIG. 1G schematically illustrates a scene from above where at least one camera 2A covers a field of view in which an object 10 is located. FIG. 1H depicts the corresponding scenario in a side view. By direct reception of light from the object 10, object detection data is obtained using a real camera 2A. Moreover, by detection of light from the mirror 6, object detection data associated with an image object is obtained in the camera 2A, which data is characterized as originating from a virtual object 10'.

Based on the determination that the image object is a reflection, and the knowledge of the position and orientation of the mirror 6, a virtual view is generated associated with a virtual camera or imaging device 2B. Moreover, since it has been determined that the object detection data associated with the virtual object 10' is a reflection, a process is operated to remove 108 the object detection data associated with that image object 10' from the view of the real imaging device 2A. The object detection data associated with the reflected detection, which forms a data part of the object detection data corresponding to the first view, is thus removed from data associated with the real camera 2A and added to the data of the corresponding created virtual camera 2B. The data part that is removed from the first view may be one or more entries in a table of ODD corresponding to the first view, such as the table described with reference to FIG. 1B. In some embodiments, this step of processing the object detection data comprises providing a common object identifier for the first image object of the virtual view and the second image object of the real image view, where the image object of the first view is determined to be a reflection of the image object in the second view. With reference to FIG. 1F, the object detection data of the reflected image, with identifier O4, is determined by one of the processes outlined herein to be a mirror image associated with the object detection data of the image object identified as O5. Processing of the object detection data is thus carried out to use a common object identifier, e.g. O5, for the object detection data associated with the direct view and for the object detection data associated with the virtual view.

The detection from the virtual camera should be flipped horizontally, as indicated by the mutual orientation of cameras 2A and 2B in FIG. 1G. This may include transforming the object detection data associated with the image object such that the virtual view is horizontally flipped with respect to the real image view.

For each camera, and each mirror that a camera can see, one or many virtual camera(s) may thus be created. Specifically, the view of the real camera 2A, or the real view of another camera in the system, and the view of the virtual camera 2B, overlap such that the associated object detection data comprises data associated with a common object. The result is a system and method with at a combined benefit. First of all, object detection data that may cause errors in positioning are removed from the real camera 2A, Secondly, rather than disregarding the removed data, it is actually used as object detection data of the created virtual camera 2B. Indeed, the reflection shows a side of the real object 10 that it otherwise concealed to the real camera 2A. Hence, the object detection data of the virtual camera 2B actually adds value, by providing a new angle to the real object 10, and imaging of a portion of the object not detected by direct imaging using the real camera 2A.

In order to obtain positioning data, computation 110 is carried out based on the object detection data associated with at least the view of real camera 2A or another camera of the system, and the created virtual view. This may be obtained by a fusion process described in the following. The fusion may initially be working with input from only the real cameras, wherein the processing of the obtained object detection data to identify a first image object of a first view as a mirror reflection of a real object is carried out on position data obtained by means of the fusion process. Based on the detection, and on the subsequent creation of the virtual view based on object detection data removed from the object detection data of a real camera, the fusion process to compute a position of an image object may then be extended with one or more stream(s) from the virtual camera(s). Consequently, the noisy reflections from the real cameras are removed and a new virtual stream is added that improves the accuracy of the system.

Further aspects of the method and system, associated with at least the step of computing 110 a position of an image object, will now be described. In the following, it shall be noted that one of the views may be a virtual view associated with a virtual camera or imaging device 2B based on a real imaging device 2A in accordance with the above.

Figure 2A:
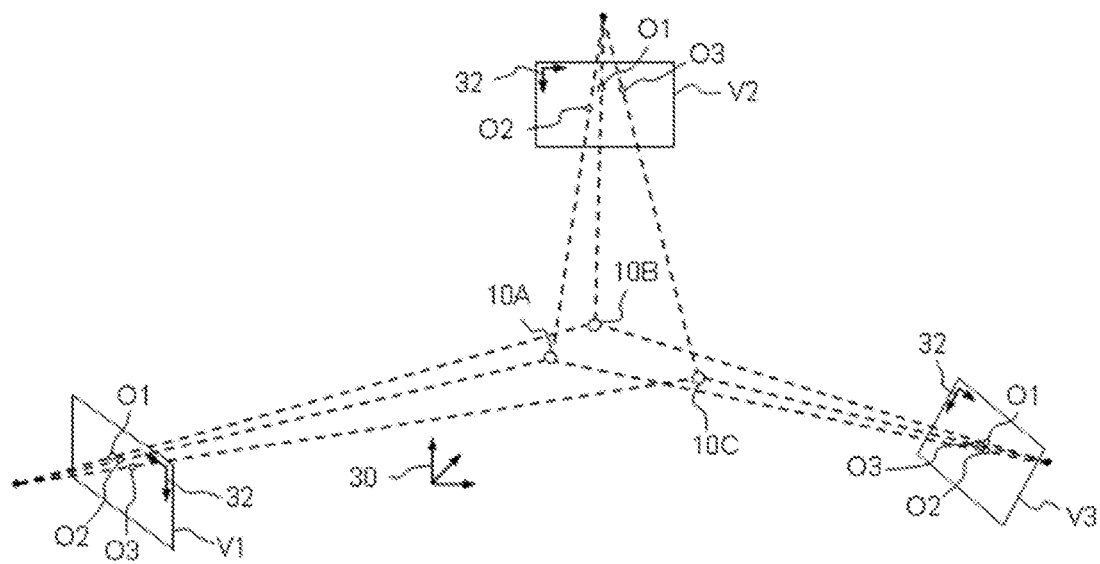
FIG. 2A illustrates a theoretical detection of three objects by a monitoring system.

FIG. 2A illustrates an ideal process of computing 3D positions 10A, 10B, 10C in the scene coordinate system 30 based on detected objects O1, O2, O3 in three views V1-V3. Each object O1-O3 in the respective view V1-V3 may be represented by the main keypoint (K1 in FIG. 1C). The position of the objects (main keypoints) is given in the local coordinate system 32 of the respective view V1-V3. FIG. 2A presumes that the ODD has been processed to identify corresponding objects O1-O3 between the views V1-V3. Generally, no inference can be drawn that the object identifiers match between the views, but a dedicated matching process needs to be performed to identify corresponding objects between the views. The example of FIG. 2A presumes that the objects O1, O2 and O3, respectively, are associated between the views. Since the relative location and orientation of the imaging devices 2 are known, a respective 3D position 10A-10C in the scene coordinate system 30 may be computed based on the detected positions of the objects O1-O3 in the local coordinate system 32 of the respective view V1-V3, for example by conventional triangulation and based on the known relative positions and orientations of the imaging devices 2 (and thus between the views V1-V3). For example, epipolar geometry may be used.

The process in FIG. 2A is sensitive to inaccuracies in the ODD, for example slight inaccuracies in the detected location of the respective object O1-O3 in the respective view V1-V3.

Figure 2B:
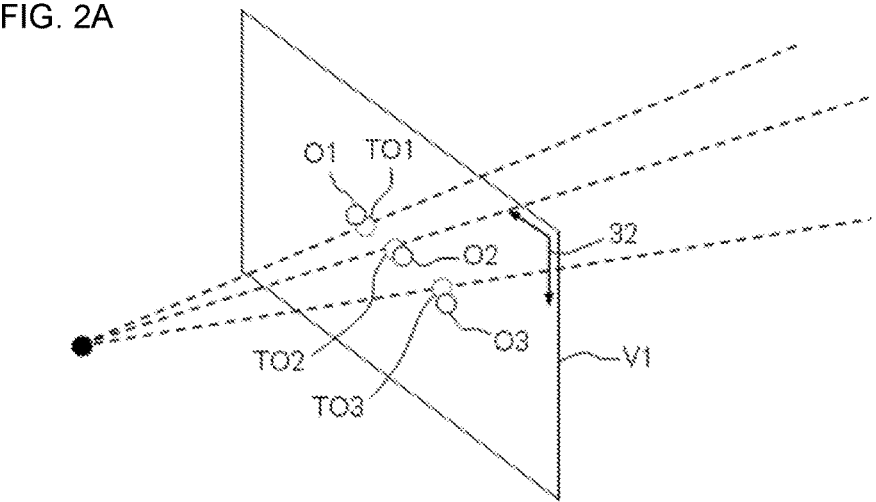
FIGS. 2B-2C illustrate the impact of detection errors on reconstructed 3D object positions.
Figure 2C:
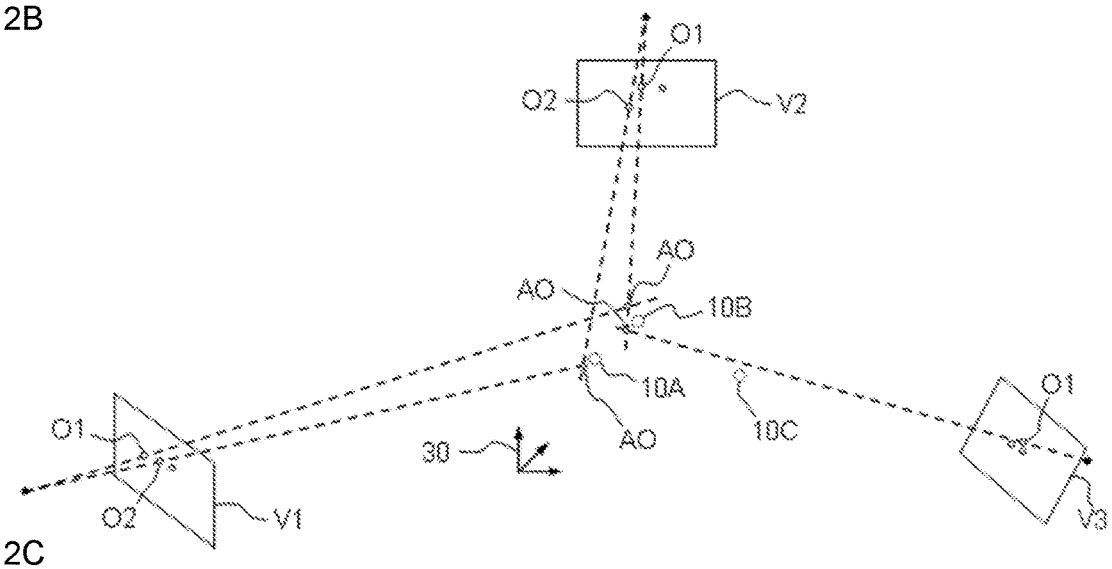

FIG. 2B illustrates three detected objects O1-O3 in view V1. Due to disturbances in the imaging process, for example noise, tolerances, vibrations, temperature changes, etc., the detected locations of the objects O1-O3 may be slightly displaced from the theoretical locations of the objects in the view V1. The theoretical object locations are indicated by dotted circles and designated TO1-TO3 in FIG. 2B. By comparing FIGS. 2A-2B, it is realized that the ideal process in FIG. 2A presumes that the triangulation is based on the theoretical object locations TO1-TO3. FIG. 2C exemplifies the computation of 3D positions in the scene coordinate system 30 for some of the detected objects O1, O2, O3 in the presence of disturbances. Specifically, FIG. 2C indicates a few apparent positions AO that result from triangulation of detected objects between pairs of views, in this example between O1 in V1 and O1 in V2, between O2 in V1 and O2 in V2 and between O1 in V2 and O1 in V3. In FIG. 2C, the true 3D positions are indicated by dotted circles. As understood, if 3D positions are computed for pairs of objects between the views, the resulting 3D positions will exceed the true 3D positions 10A-10C in number and will be scattered around the true 3D positions. Since the distance between the imaging devices 2 and the scene 5 may be large, small disturbances in the views may result in significant deviations of the resulting 3D positions from the true 3D positions. Thus, the inevitable disturbances make it difficult to accurately compute 3D positions from multiple views. Further, the disturbances may cause the matching process to incorrectly match objects between views. It is also conceivable that the disturbances cause the detection device 3 to make an incorrect assignment of a keypoint to an object and/or of a position to a keypoint, so that the ODD contains unforeseeable errors.

The embodiments described in the following increases the robustness to the above-described disturbances and implements a methodology of processing the ODD for generation of 3D positions in the scene coordinate system 30 which is deterministic and applicable irrespective of the nature or type of the objects that are represented by the ODD.

Figure 3A:
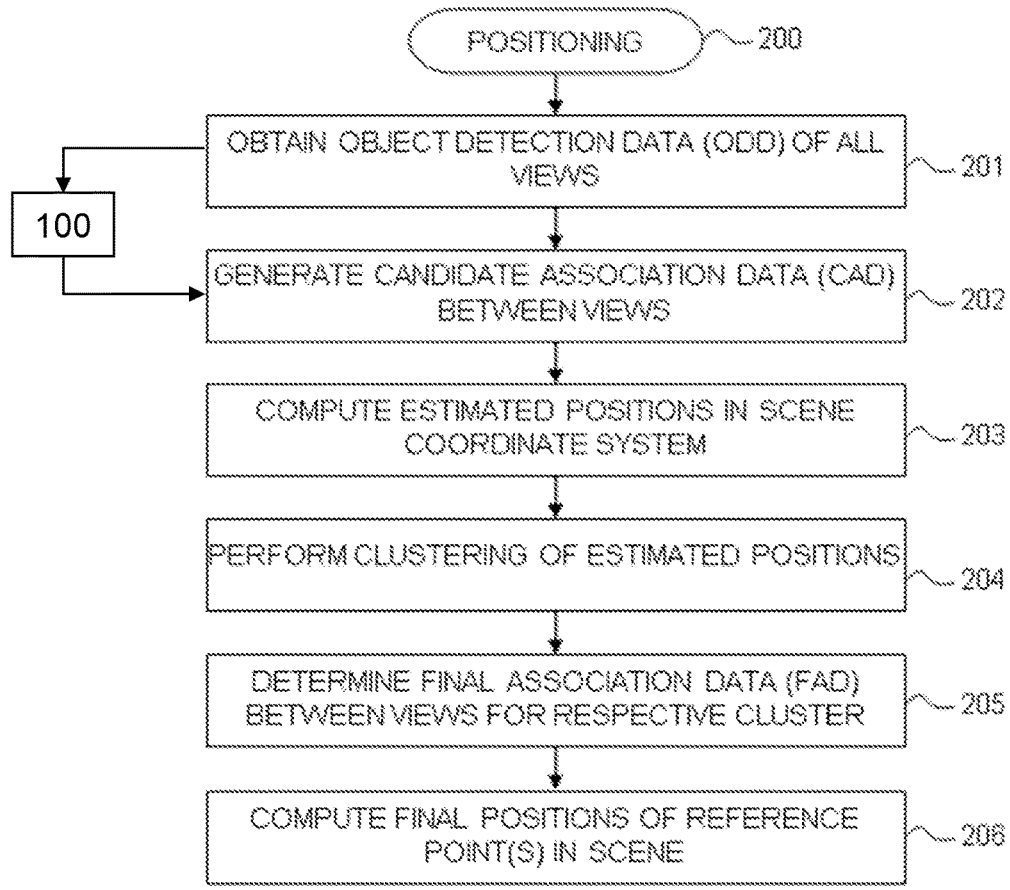
FIGS. 3A-3C are flow charts of methods in accordance with embodiments.

FIG. 3A is a flow chart of a positioning method 200 that may be implemented by the positioning device 4 in FIG. 1A. In step 201, the ODD is obtained, for example from the detection device 3. As noted above, the ODD is indicative, for each view, of the detected objects and the location of one or more keypoints of the respective object.

As already indicated, positioning may initially be carried out based only on object detection data associated with real imaging devices/cameras 2, following steps 200-206. however, the process further comprises the steps described with reference to FIG. 1I, to identify reflections and create one or more virtual views based thereon. At least the process steps 100, including steps 104-108, may be carried out after step 200 and prior to step 202, as indicated in FIG. 3A. In such embodiments, one of the views V1-V3 described below may thus represent a virtual view.

In step 202, the ODD is processed to generate candidate association data (abbreviated CAD), which associates pairs of objects between the views of the scene.

Thus, step 202 identifies the correspondence between objects in pairs of views. The CAD may be any suitable data structure that designates associated pairs of objects. In the simplified example of FIG. 2C, step 202 may generate the CAD to include the following associated pairs of objects: (O1,V1)-(O1,V2), (O2,V1)-(O2,V2), (O3,V1)-(O3,V2), (O1,V2)-(O1,V3), (O2,V2)-(O2,V3), (O3,V2)-(O3,V3), (O1,V1)-(O1,V3), (O2,V1)-(O2,V3), (O3,V1)-(O3,V3). Any suitable association evaluation technique may be used. In one non-limiting example, step 202 evaluates each pair of views for correspondence between objects based on a spatial matching criterion, which represents the spatial similarity between the objects. For example, the spatial matching criterion may evaluate the location of one or more keypoints of an object in one view in relation to the location of one or more keypoints of an object in another view. The spatial matching criterion may be based on or include the symmetric epipolar distance, the reprojection error, or any similar measure for comparing images. Such measures are well-known and available to the person skilled in the art. The spatial matching criterion may include the above-mentioned confidence score, if included in the ODD. The spatial matching criterion may be calculated only for one keypoint of each object, for example a main keypoint, or for a plurality of keypoints of each object, for example as a (weighted) aggregation of distances or errors. It may be noted that by the association of two objects in the CAD, the keypoints of the two objects are also inherently associated in pairs. For example, the association (O1,V1)-(O1,V2) implies that L1 of (O1,V1) corresponds to L1 of (O1,V2), L2 of (O1,V1) corresponds to L2 of (O1,V2), and so on.

In step 203, a plurality of estimated positions is computed in the scene coordinate system 30 for associated pairs of objects in the CAD. Each estimated position is thus a 3D position in the scene. Step 203 may involve processing each pair of objects in the CAD to calculate a respective 3D position for one or more associated keypoints. In one example, the 3D position is calculated by use of conventional triangulation, for example based on epipolar geometry. Step 203 may also involve a spatial filtering which comprises comparing the 3D positions to the spatial limits of the scene 5 and removing any 3D position that falls outside the spatial limits. Further, the pairs of objects or keypoints that yield such a 3D position may be removed from the CAD. In the example of FIG. 2C, the points AO represents some of the 3D positions that are computed by step 203.

Step 203 may compute the estimated positions for only one keypoint of each object, for example a main keypoint, or for a plurality of keypoints of each object. The computational complexity increases with an increasing number of estimated positions and it may be advantageous to compute the plurality of estimated positions for a subset of the available keypoints of the respective object. In fact, adequate performance may be achieved by using only the main keypoints in step 203.

In step 204, a clustering algorithm is operated on estimated positions from step 203, including at least one estimated position for each object, to determine one or more clusters of estimated positions. The clustering algorithm is operated to determine the respective cluster as a subspace of locally increased density of estimated positions. The clustering algorithm may be any type of density-based clustering, including but not limited to DBScan, OPTICS, meanshift, etc. The clustering in step 204 accounts for the above-described scattering of 3D positions caused by the disturbances (FIGS. 2B-2C) by grouping the scattered 3D positions into clusters. Further, the clustering makes it possible to remove spurious data, for example clusters containing one or only a few 3D positions, from further processing to potentially improve both speed and accuracy. Thus, step 204 may render the method 200 more robust to disturbances.

Step 205 generates, based on the estimated positions in one or more of the clusters determined by step 204, final association data (abbreviated FAD) which associates one or more objects between the views of the scene. The FAD may be any suitable data structure that designates associated objects between the views. It should be noted that the FAD may designate associated objects between more than two views. In the simplified example of FIG. 2C, step 205 may generate the FAD to include the following associations: (O1,V1)-(O1,V2)-(O1,V3), (O2,V1)-(O2,V2)-(O2,V3), (O3,V1)-(O3,V2)-(O3,V3). Step 205 may evaluate the originating pair of objects for each 3D position in a cluster, as given by the CAD, for example by use of an optimization algorithm to seek for at least one object in each view that is sufficiently consistent with the 3D positions in the cluster. It is to be understood that a cluster may correspond to more than one object in a view, for example as a result of crowding, and that an object may be missing in a view, for example as a result of occlusion. By operating on individual clusters in step 205, the determination of the FAD is greatly facilitated and erroneous associations are suppressed, even in the presence of crowding or occlusion. Different implementation examples of step 205 will be described below with reference to FIGS. 3B-3C.

In step 206, final 3D positions in the scene coordinate system 30 are computed for one or more keypoints of the objects that are associated according to the FAD. In one example, the respective final 3D position is calculated by triangulation, for example based on epipolar geometry. If there are more than two views, the triangulation will be overdetermined, which will further reduce the impact of disturbances. Step 206 may thus comprise combining, between the views of the scene and in accordance with the FAD, locations of one or more keypoints of the associated objects, and operating a position calculation function on the combined locations to generate the final 3D positions. The position calculation function may comprise any conventional triangulation or reconstruction algorithm, including but not limited to mid-point method, direct linear transformation, use of essential and/or fundamental matrix, etc. The final 3D positions from step 206 provides a 3D position determination of an object in the scene 5. If the final 3D positions correspond to more than one keypoint for an object, step 206 also provides an 3D pose determination of the object.

It is realized that steps 201-206 may be repeated at consecutive time steps, for example when the detection device 3 operates on video streams from the imaging devices 2 (FIG. 1A) and 2A, 2B (FIG. 1H). Any conventional tracking algorithm may operate on the final 3D positions generated by step 206 at the consecutive time steps to track the motion of one or more objects or keypoints over time.

Figure 3B:
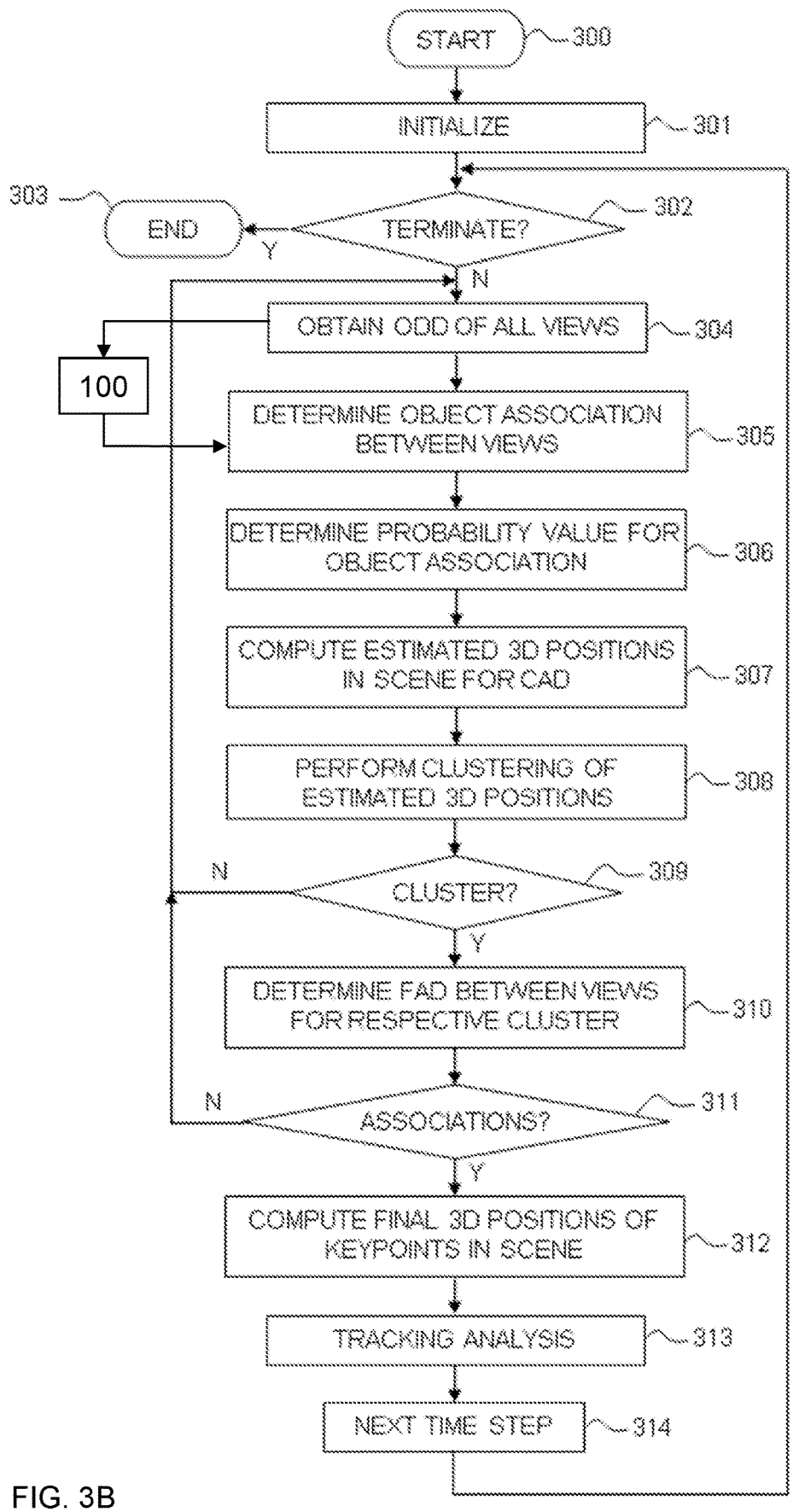
Figure 3C:
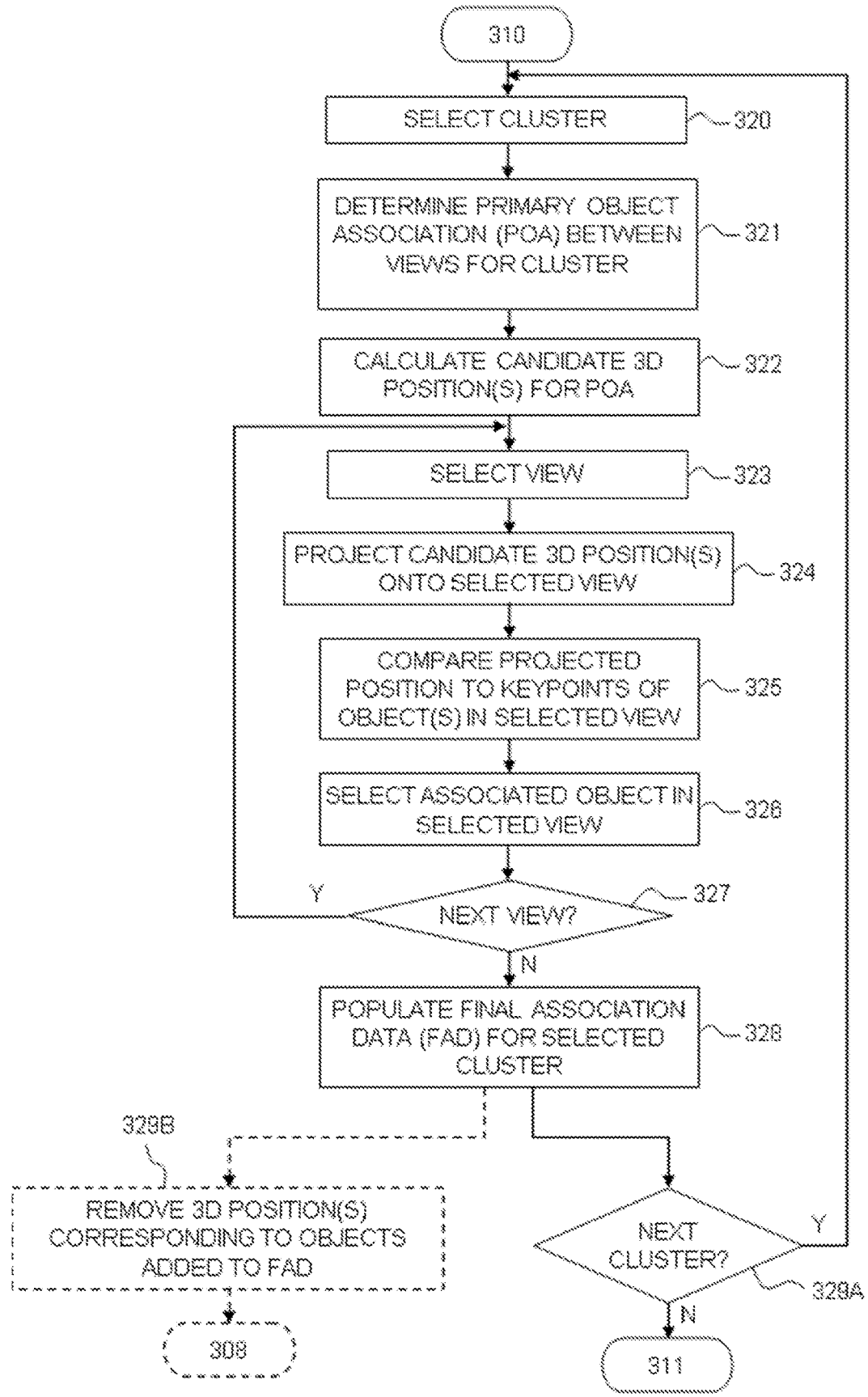

The steps of the method 200, as well as additional steps, will be further exemplified with reference to a method that is represented by flowcharts in FIGS. 3B-3C. When started (step 300), the method proceeds to initialize various parameters, including the data structures for the CAD and the FAD. The method then repeatedly performs steps 302-314, until step 302 detects a termination instruction, which causes the method to end (step 303). The termination instruction may correspond to a signal indicative of an error in the execution of the method or a user-initiated termination.

Step 304 corresponds to step 201 and involves obtaining the ODD, and step 305 corresponds to step 202 and involves populating the CAD.

As indicated, positioning may initially be carried out based only on object detection data associated with real imaging devices/cameras 2, following steps 301-314. however, the process further comprises the steps described with reference to FIG. 1I, to identify reflections and create one or more virtual views based thereon. At least the process steps 100, including steps 104-108, may be carried out after step 304 and prior to step 305, as indicated in FIG. 3B. In such embodiments, at least one of the views may thus represent a virtual view.

In one embodiment, step 305 determines a candidate correspondence of one or more objects between pairs of views among the available views and generates the CAD to represent the candidate correspondence by associating object identifiers between the pairs of views. As understood from the foregoing, the CAD may also associate keypoints between the pairs of views. In step 306, a probability value is determined for each object pair association in the CAD and added to the CAD. The probability value is generated to represent the likelihood that the association is correct. The probability value may be computed as a function of any conceivable evaluation parameter, for example any one or a combination of the above-mentioned confidence score for the respective object or its keypoints, the above-mentioned spatial matching criterion for the associated objects (reprojection error, symmetric epipolar distance, etc.), a distance between the respective object and objects detected at a preceding time point, etc.

Figure 2D:
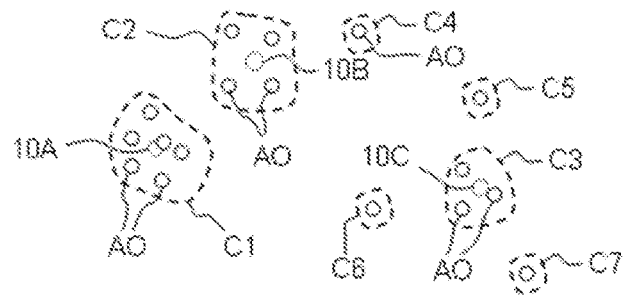
FIG. 2D illustrates clustering of reconstructed 3D object positions.

Step 307 corresponds to step 203 and involves computing, for associated objects in the CAD, estimated 3D positions in the scene coordinate system 30. An example of an ensemble of estimated 3D positions is illustrated in FIG. 2D, where open circles AO represent estimated 3D positions and dotted circles 10A-10C represent the true 3D positions.

Step 308 corresponds to step 204 and involves clustering of the estimated 3D positions from step 307. An example of the resulting clusters is also included in FIG. 2D, where dashed lines delineate the respective cluster C1-C7. As seen, clusters C1-C3 include estimated 3D positions AO that are scattered around the true 3D positions 10A-10C. Step 308 may also comprise removing all clusters for which the included number of estimated 3D positions falls below a threshold, for example 2 or 3. In the example of FIG. 2D, a threshold of 2 would eliminate clusters C4-C7 from further processing.

If step 308 results in at least one cluster, step 309 proceeds to step 310, otherwise it returns to step 304. Step 310 corresponds to step 205 and involves populating the FAD with associations, if any, of one or more objects between the available views. Each association identifies a correspondence of an object between two or more of the available views. Like in step 205, the associations are determined by evaluation of the estimated 3D positions in the respective cluster.

If step 310 results in at least one association, step 311 proceeds to step 312, otherwise it returns to step 304. Step 312 corresponds to step 206 and involves computing, based on the association(s) in the FAD, one or more final 3D positions in the scene coordinate system 30.

Step 313 performs a tracking analysis of the final 3D positions from step 312 to identify a correspondence between final 3D positions over time. Step 313 may involve storing the current final 3D positions in memory, and matching the current final 3D positions to final 3D positions computed (and stored in memory) at one or more preceding time points. It is also conceivable that the tracking analysis is temporally offset and arranged to match the current final 3D positions to final 3D positions computed at one or more succeeding time points, in addition to or instead of final 3D positions computed at one or more preceding time points.

After step 313, step 314 returns the method to perform step 304 at a subsequent time point.

An implementation example of step 310 is represented by a flow chart in FIG. 3C and will be explained with reference to FIGS. 2E-2I. This implementation example handles the situation that the estimated 3D positions in a cluster originate from more than one object in a view.

In step 320, a cluster is selected among the one or more clusters from step 308. The selected cluster may be determined based on any suitable criterion, for example a count of the estimated 3D positions in the respective cluster, or an aggregated probability value for the estimated 3D positions that are included in the respective cluster. Recalling that step 306 may determine a probability value for each object pair in the CAD, this would mean that there is a probability value for each estimated 3D position. In one embodiment, step 320 selects the cluster with the largest weight, for example given by the count or the aggregated probability value.

Step 321 determines a primary object association (POA) between a group of views for the selected cluster from step 320. The POA identifies a primary object in each view among the group of views, which may be a subset of the available views.

Figure 2E:
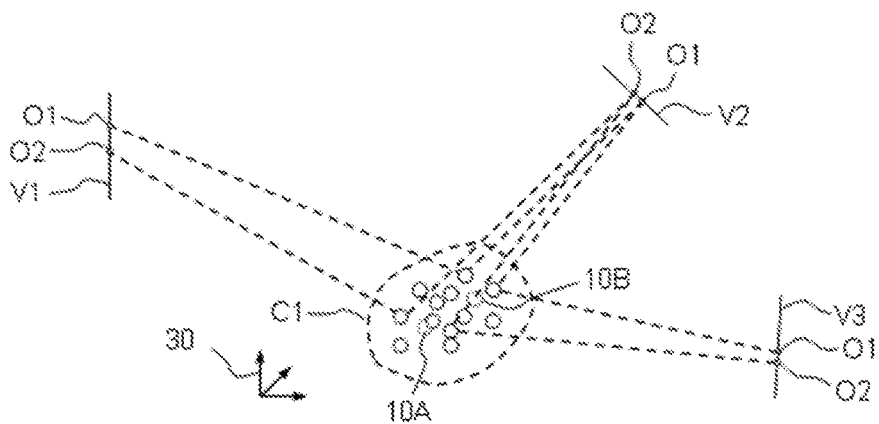
FIGS. 2E-2F illustrate cluster evaluation for object association between views.
Figure 2F:
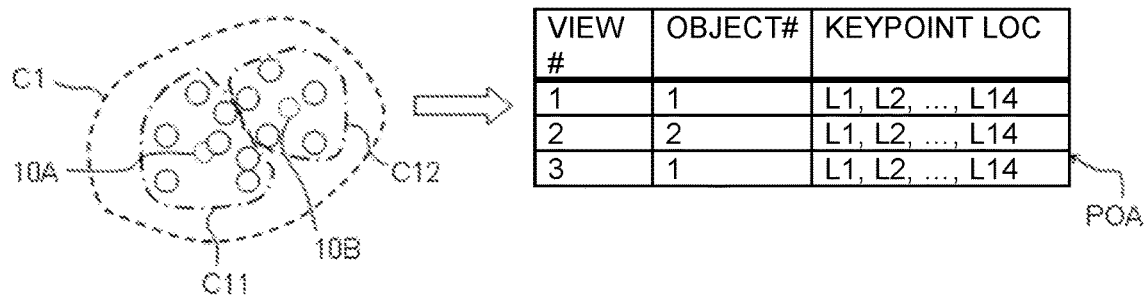
Figure 2G:
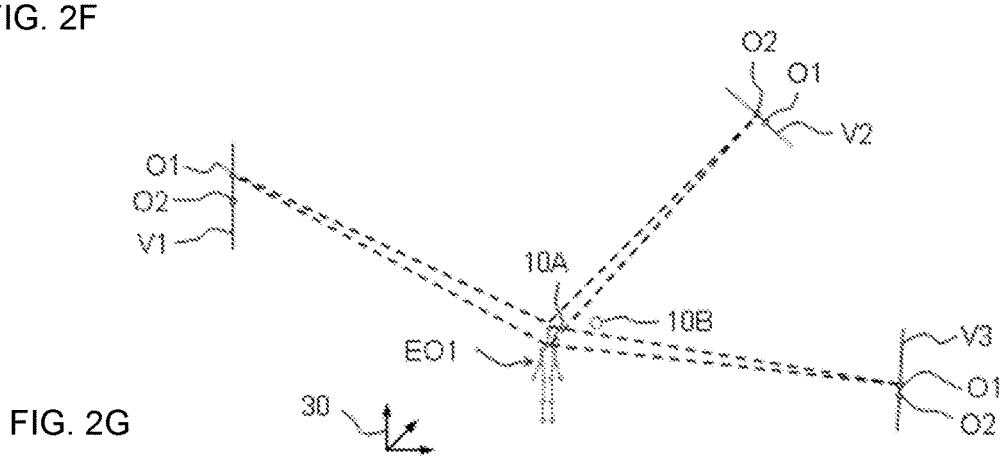
FIGS. 2G-2H illustrate reprojection processing for object association between views.

Step 321 is exemplified in FIGS. 2E-2F, in which a cluster C1 contains estimated 3D positions (open circles) that at least partly correspond to two true 3D positions 10A, 10B (dotted circles). In one embodiment, step 321 determines the POA to define a consistent association of a single object between all views in the group of views. As used herein, such a "consistent association" results in at least a subset of the estimated 3D positions, given the candidate associations in the CAD. Step 312 may thus evaluate the candidate associations that correspond to the estimated 3D positions to find one object in each view that could render at least a subset of the estimated 3D positions of the cluster. In the example of FIG. 2E, dashed lines indicate some candidate associations, given by the CAD, between two objects O1, O2 in three views V1-V3, where the respective candidate association corresponds to an estimated 3D position (open circle).

Step 321 may be implemented to perform an exhaustive search which involves evaluating, in accordance with the CAD, all possible combinations of objects between the views, where each combination results in a respective set of estimated 3D positions, and selecting the best combination among the combinations to form the POA. Step 321 may instead be implemented to find the best combination by use of an optimization algorithm, for example a greedy algorithm. Assuming that each estimated 3D position is assigned a score value, the best combination may be selected to yield the largest aggregation of score values for the set of estimated 3D positions. In one example, the score value is the same for all estimated 3D positions, causing step 312 to select the combination that results in the largest set of estimated 3D positions. In another example, the score value is set in proportion to the above-mentioned probability value. In the example of FIG. 2F, the cluster C1 has been evaluated by step 321. The table in FIG. 2F represents the POA, which thus is (O1,V1)-(O2,V2)-(O1,V3).

In a variant, step 321 is performed before step 320 on all clusters from step 308, and step 320 determines the selected cluster as a function of the aggregated score value of the POA determined by step 321 for the respective cluster. For example, step 320 may select the cluster with the largest aggregated score value.

Step 322 computes at least one candidate 3D position in the scene coordinate system 30 for the POA of the selected cluster. The candidate 3D position may thus be computed for only one keypoint of the object in the respective view, according in the POA, for example a main keypoint, or for a plurality of keypoints of each object. It should be noted that the respective candidate 3D position may differ from the estimated 3D positions, which are computed for objects between pairs of views, since the candidate 3D positions may be computed for objects associated across more than two views. Step 322 may compute the candidate 3D position(s) in the same way that steps 206 and 312 computes the final 3D position. Step 322 may be seen to correspond to a merging of a set of estimated 3D positions which are scattered within a cluster (for example C11 in FIG. 2F) into a candidate 3D position. Step 322 is exemplified in FIG. 2G, where candidate 3D positions are computed for two keypoints of the objects that are associated by the POA in FIG. 2F, for example keypoints K1 and K2 (cf. FIG. 1C). The candidate 3D positions thereby form a representation of an estimated object EO1 in the scene.

Figure 2H:
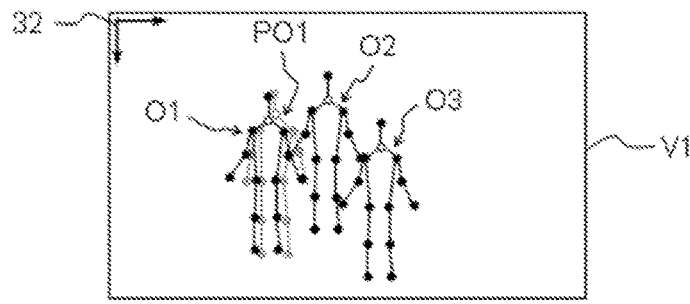

Step 323 selects one of the views that are included in the POA, and step 324 projects the candidate 3D position(s) from step 322 onto the selected view to generate corresponding projected position(s) in the local coordinate system 32 of the selected view. Step 325 matches the projected position(s) to the locations of the keypoints of the respective object in the selected view, according to the ODD, and evaluates a comparison score for the respective object. The comparison score thus generally represents a similarity between the projected position(s) and the location of corresponding keypoint(s) of the respective object. The comparison score is computed by a comparison function, including but not limited to a sum of distances between corresponding projected positions and keypoints in the selected view, Object Keypoint Similarity (OKS), Percentage of Correct Keypoints (PCK), Intersection over Union (IoU) between bounding boxes, or any other conventional function for comparing two sets of positions. Step 326 selects the comparison score that indicates the highest similarity and compares it to a threshold value. If the similarity is deemed sufficient, step 326 selects the related object for entry as an associated object in the FAD, otherwise no associated object is selected. It is realized that the accuracy of step 326 may be improved by steps 324-325 operating on a plurality of candidate 3D positions. FIG. 2H illustrates a projected object PO1 comprising a full set of projected positions in the view V1 of FIG. 1D. Clearly, step 326 will select object O1 with high certainty.

Step 327 repeats steps 323-326 for all views that are included in the POA, and step 328 populates the FAD with a set of associated objects for the selected cluster. Step 328 may also remove the set of associated objects from the ODD.

The flowchart in FIG. 3C depicts two alternative processing paths after step 328.

Figure 2I:
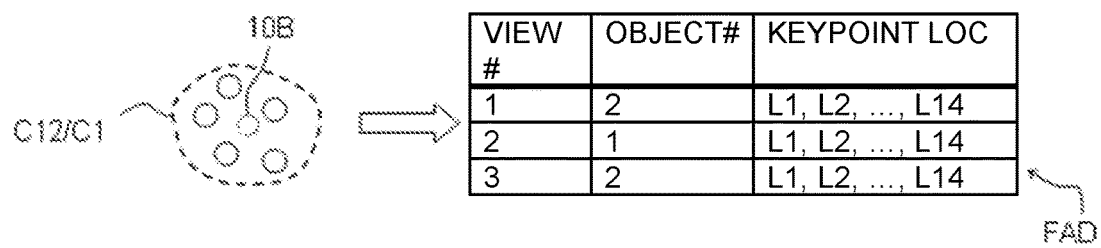
FIG. 2I illustrates a further cluster evaluation subsequent to the cluster evaluation in FIG. 2E.

In a first processing path, the method may proceed to step 329A which checks if there is at least one additional cluster to process among the clusters from step 308. If so, the method is returned to step 320 for selecting a cluster among the additional cluster(s), otherwise the method proceeds to step 311. Optionally, the first processing path may comprise an additional step before step 329A that removes the set of estimated 3D positions that corresponds to the POA (cf. sub-cluster C11) from the latest selected cluster and forms a new cluster that contains any remaining estimated 3D positions in the latest selected cluster. In the example of FIG. 2F, the new cluster would correspond to sub-cluster C12. As shown in FIG. 2I, the cluster C12 may eventually be processed by steps 321-328, which may result in the POA represented by a table in FIG. 2I: (O2,V1)-(O1,V2)-(O2,V3).

In a second processing path, indicated by dashed lines in FIG. 3C, the method proceeds to step 329B which updates the plurality of estimated 3D positions (computed by step 308 at the current time point) and proceeds to step 308, which performs clustering of the updated plurality of estimated 3D positions. In one embodiment, the updating in step 329B comprises identifying, among the plurality of estimated positions, a first set of estimated positions that correspond to the objects added to the FAD by step 328, and removing the first set of estimated positions from the plurality of estimated positions. The second processing path thus repeats the clustering for remaining estimated 3D positions. This repeated clustering may allow the subsequent processing to reveal hidden relations between the objects in the images. The foregoing is equivalent to removing, from the CAD, all associations comprising the objects that were added to the FAD by step 328, and proceeding to step 307, but eliminates the need to re-compute the estimated 3D positions for the remaining associations in the CAD.

Optionally, step 329B may also compute a set of final 3D positions for the objects that were added to the FAD by step 328 and use the set of final 3D positions for updating the plurality of estimated 3D positions. In one embodiment, the updating in step 329B further comprises identifying a second set of estimated positions which are located within a predefined distance from the set of final 3D positions, and removing the second set of estimated positions from the plurality of estimated positions. This embodiment has the advantage of removing spurious estimated positions and may thereby reduce the number of clusters that are processed by the method. The foregoing is equivalent to removing, from the CAD, all associations that result in an estimated 3D position located within the predefined distance from the set of final 3D positions, and proceeding to step 307. It may also be noted that step 312 may be omitted in this embodiment, since the final 3D positions are instead computed as part of step 329B.

Figure 4:
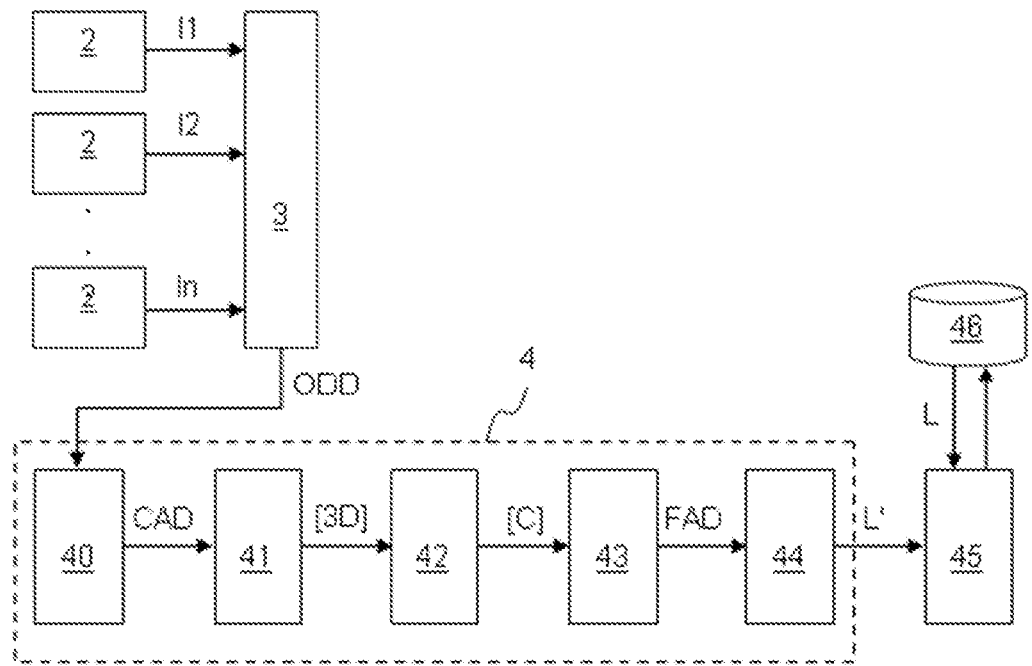
FIG. 4 is a block diagram of a monitoring system in accordance with an embodiment.

FIG. 4 is a block diagram of a monitoring system in accordance with an embodiment. The monitoring system comprises imaging devices 2, which are arranged to generate at least two images I1-In of a scene. The images I1-In are received by a processing device ("detection device") 3, which is configured to process the images I1-In to generate the object detection data (ODD). The ODD is obtained by a monitoring device ("positioning device") 4, which is configured to implement any one of the methods described herein. In the illustrated example, the positioning device 4 comprises first to fifth modules 40-44. The first module 40 is configured to generate the candidate association data (CAD) based on the ODD, for example in accordance with step 202 or steps 305-306. The second module 41 is configured to generate the plurality of estimated 3D positions ([3D]) based on the CAD, for example in accordance with step 203 or step 307. The third module 42 is configured to determine one or more clusters ([C]) for the plurality of estimated 3D positions, for example in accordance with step 204 or step 308. The fourth module 43 is configured to determine final association data (FAD) for the cluster(s), for example in accordance with step 205 or step 310. The fifth module 44 is configured to compute the final 3D positions L' based on the FAD, for example in accordance with step 205 or step 312.

The monitoring system in FIG. 4 also includes a tracking device 45 which may be separate from, as shown, or part of the monitoring device 4. The tracking device 45 may be configured to maintain a tracking list L, which is stored in a memory 46. The tracking list L holds information about objects that are currently detected and tracked. More specifically, for each object, the tracking list L contains current 3D positions of its keypoint(s) and an overall tracking score. The tracking device 45 is configured to update the tracking list L whenever the monitoring device provides L' for a new time point. The tracking device 45 may apply any conventional tracking algorithm to update the tracking list L based on L'. In one example, the tracking device 45 is configured to match objects in L to objects L', for example formulated as a bipartite graph maximum weight matching problem. The tracking device 43 may, for each object in L that is matched to an object in L', update the object's 3D position(s) with those in L' and increase the object's tracking score up to certain limit. The tracking device 43 may further, for each object in L that is not matched to an object in L', reduce the object's tracking score, and if the tracking score drops below certain threshold, remove the object from L. The tracking device 43 may further, for each object in L' that is not matched to an object in L, add the object and its 3D position(s) to L with a default tracking score.

Figure 5:
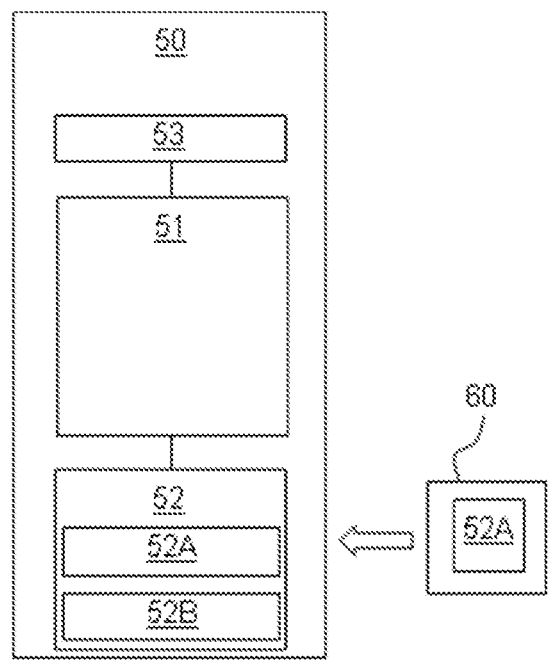
FIG. 5 is a block diagram of a machine that may implement any one of the methods in FIGS. 3A-3C.

The structures and methods disclosed herein may be implemented by hardware or a combination of software and hardware. In some embodiments, such hardware comprises one or more software-controlled computer resources. FIG. 5 schematically depicts such a computer resource 50, which comprises a processing system 51, computer memory 52, and a communication interface 53 for input and/or output of data. The communication interface 53 may be configured for wired and/or wireless communication, including communication with the detection device 3. The processing system 51 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 51A comprising computer instructions is stored in the memory 52 and executed by the processing system 51 to perform any of the methods, operations, functions or steps exemplified in the foregoing. As indicated in FIG. 5, the memory 52 may also store control data 52B for use by the processing system 52. The control program 52A may be supplied to the computing resource 50 on a computer-readable medium 60, which may be a tangible (non-transitory) product (e.g. magnetic medium, optical disk, read-only memory, flash memory, etc.) or a propagating signal.

The foregoing description has focused on handling a single type of objects. However, it is straight-forward to extend the disclosed technique to processing of images that depict different types of objects, for example by processing each type of object separately. In one example, the detection device 3 may output one ODD for each type of object in an image, and steps 202-206 or steps 305-312 may be operated on each ODD separately. Although the objects are represented as human individuals in the foregoing examples, the disclosed technique is applicable to any type of object, be it living or inanimate, moving or stationary.

The techniques disclosed and exemplified herein have a variety of applications such as 3D vision inspection, product assembly, goods inspection, human-computer interaction, video surveillance, sports broadcasting, industry robot control, navigation, etc. The present Applicant also contemplates to arrange a monitoring system that implements the disclosed technique to track individuals in an exercise situation, for example in a gym. For example, the monitoring system may track how the individuals move around the gym, identify activity and count repetitions by use of the tracked 3D positions of the individuals, for example representing joints of the individuals, and store corresponding exercise data for the respective individual in a database for access by the respective individual or another party. In such a monitoring system, it may be desirable to allow the respective individual to give consent to its exercise data being stored in the database. In one embodiment, such consent is registered when the monitoring system detects that the individual is positioned at a specified location and/or in a specified 3D pose within the scene for a specified time period.

In the following, a set of items are recited to summarize some aspects and embodiments of the invention as disclosed in the foregoing.

Item 1: A method of determining positioning of objects in a scene based on a plurality of views, comprising:

obtaining (102) object detection data, ODD, corresponding to one or more views of the plurality of views of the scene, wherein each of the one or more views is captured by a respective camera, said ODD comprising an object identifier of a respective image object in a respective view and a location of a respective reference point of the respective image object in the respective view;

processing (104) the obtained ODD to identify a first image object of a first view of said one or more views as a mirror reflection of a real object;

creating (106) a virtual view associated with a virtual camera position, with ODD corresponding to said virtual view comprising a data part of the ODD corresponding to the first view, which data part is associated with the identified first image object;

removing (108) said data part of the ODD associated with the first image object from the first view; and computing (110), based on the ODD associated with at least said virtual view and a further view of the one or more views, a position of said first image object.

Item 2: The method of item 1, wherein processing the ODD comprises identifying the first image object based on prestored mirror location data in the scene.

Item 3: The method of item 1 or 2, wherein creating the virtual view comprises transforming the ODD associated with the first image object such that the virtual view is horizontally flipped with respect to the first view.

Item 4: The method of any preceding item, wherein processing the ODD comprises
detecting a second image object comprised in said further view, and
identifying the first image object as a mirror image of the second image object.

Item 5. The method of item 4, wherein processing the ODD comprises
correlating appearance, e.g. spatial movement or color, of a first reference point of the first image object with corresponding appearance, i.e. spatial movement or color, of a second reference point of the second image object to identify the first image object as a mirror image of the second image object.

Item 6: The method of item 4 or 5, wherein processing the ODD comprises providing a common object identifier for the first image object and the second image object.

Item 7: The method of any of items 4-6, wherein the computing comprises
processing of the ODD to generate candidate association data which associates pairs of objects between the views of the scene, wherein the processing further comprises
computing a plurality of estimated positions in a scene coordinate system of the scene for associated pairs of image objects in the candidate association data;
determining one or more clusters of the plurality of estimated positions;
generating, based on estimated positions in at least one cluster among the one or more clusters, final association data which associates one or more image objects between the views of the scene; and
computing, based on the final association data, one or more final positions in the scene coordinate system of the scene for one or more reference points of said first image object.

Item 8: The method of item 7, wherein said processing (202; 305-306) the object detection data to generate candidate association data comprises: determining (305) a candidate correspondence of said one or more objects between pairs of views among the views of the scene, and wherein the candidate association data associates object identifiers between said pairs of views to represent the candidate correspondence.

Item 9: The method of item 8, wherein the candidate association data further associates a set of reference points between said pairs of views.

Item 10: The method of any of items 7-9, wherein said determining (204; 308) the one or more clusters comprises: operating a density-based clustering algorithm on the plurality of estimated positions.

Item 11: The method of any of items 7-10, wherein said generating (205; 310) the final association data comprises: determining (321) a primary object association between a group of views for said at least one cluster, the primary object association identifying a primary object in each view among the group of views; computing (322), based on the primary object association, at least one candidate position in the scene coordinate system of the scene; and projecting (324) said at least one candidate position onto the group of views to generate at least one projected position on said each view, wherein the final association data is generated based on said at least one projected position on said each view.

Item 12: The method of item 11, wherein said computing (322) the at least one candidate position comprises: computing (322) a plurality of candidate positions for reference points of said primary object in said each view, wherein said projecting (324) results in projected positions on said each view, and wherein said generating (205; 310) the final association data further comprises: evaluating (325-326) the projected positions on said each view in relation to reference points of the respective object in said each view, wherein the final association data is generated based on said evaluating (325-326).

Item 13: The method of item 12, wherein said evaluating (325-326) the projected positions comprises: computing (325) a comparison score for the projected positions on said each view in relation to the reference points of the respective object in said each view; selecting (326), based on the comparison score, objects in the group of views and including, in the final association data, an association between thus-selected objects in the group of views.

Item 14: The method of item 13, wherein said generating (205; 310) the final association data further comprises: identifying, among the plurality of estimated positions, a first set of estimated positions that correspond to said association between the thus-selected objects; generating (329B) an updated plurality of estimated positions by removing the first set of estimated positions from the plurality of estimated positions; and repeating said determining (204; 308) the one or more clusters and said generating (205; 310) the final association data for the updated plurality of estimated positions.

Item 15: The method of item 14, wherein said generating (205; 310) the final association data further comprises: identifying a second set of estimated positions which are located within a predefined distance from the one or more final positions computed based on the final association data, wherein said generating (329B) the updated plurality of estimated positions further comprises: removing the second set of estimated positions from the plurality of estimated positions.

Item 16: The method of any one of items 11-15, wherein the primary object association defines a consistent association of one object between the views in the group of views.

Item 17: The method of any one of items 11-16, wherein said determining (321) the primary object association comprises: evaluating the estimated positions in said at least one cluster to select a set of estimated positions that originate from a single object in each view among the group of views, wherein the primary object association identifies the single object in each view among the group of views.

Item 18: The method of item 17, wherein said computing (203; 307) the plurality of estimated positions comprises: assigning a score value to each estimated position in the plurality of estimated positions, wherein the set of estimated positions is selected to optimize an aggregation of score values while ensuring that the set of estimated positions originates from one object in said each view in the group of views.

Item 19: The method of item 18, wherein the score value is a probability value assigned by said processing (202; 305-306) the object detection data.

Item 20: The method of any items 7-19, wherein the respective object among the associated objects in the candidate association data is assigned a plurality of reference points, and wherein said computing (203; 307) the plurality of estimated positions is performed for a subset of the plurality of reference points of the respective object among the associated objects in the candidate association data.

Item 21: The method of any of items 7-20, wherein said computing (206; 312) the one or more final positions comprises: combining, between the views of the scene and in accordance with the final association data, locations of said one or more reference points of said one or more objects, and operating a position calculation function on the thus-combined locations to generate the one or more final positions.

Item 22: The method of any of items 7-21, wherein the respective view comprises a two-dimensional digital image, and wherein said location of the respective reference point of the respective object in the respective view is given in a local coordinate system with a fixed relation to the two-dimensional digital image.

Item 23: The method of item 22, further comprising: obtaining two-dimensional digital images captured by imaging devices facing the scene; and processing the two-dimensional digital images to generate said object detection data.

Item 24: The method of any of items 7-23, further comprising: matching (313) the one or more final positions to one or more final positions computed at one or more preceding time points and/or at one or more succeeding time points to track said one or more objects as a function of time.

Item 25: A computer-readable medium comprising computer instructions (54) which, when executed by a processing system (51), cause the processing system (51) to perform the method of any preceding item.

Item 26: A monitoring device configured to determine positioning of objects (10) in a scene (5) based on a plurality of views, said monitoring device comprising logic (51, 52) configured to control the monitoring device to:
obtain (102) object detection data, ODD, corresponding to one or more views of the plurality of views of the scene, wherein each of the one or more views is captured by a respective camera, said ODD comprising an object identifier of a respective image object in a respective view and a location of a respective reference point of the respective image object in the respective view;
process (104) the obtained ODD to identify a first image object of a first view of said one or more views as a mirror reflection of a real object;
create (106) a virtual view associated with a virtual camera position, with ODD corresponding to said virtual view comprising a data part of the ODD corresponding to the first view, which data part is associated with the identified first image object; remove (108) said data part of the ODD associated with the first image object from the first view; and
compute (110), based on the ODD associated with at least said virtual view and a further view of the one or more views, a position of said first image object.

Item 27: The monitoring device of item 26, wherein the logic is configured to
transform the ODD associated with the first image object such that the virtual view is horizontally flipped with respect to the first view.

Item 28: The monitoring device of item 26 or 27, wherein the logic is further configured to carry out any of the steps of items 2-24.

What is claimed is:

1. A method of determining positioning of objects in a scene based on a plurality of views, the method comprising:
obtaining object detection data, ODD, corresponding to one or more views of the plurality of views of the scene, wherein each of the one or more views is captured by a respective camera, said ODD comprising an object identifier of a respective image object in a respective view and a location of a respective reference point of the respective image object in the respective view;
processing the obtained ODD to identify a first image object and a second image object comprised in a first view of said one or more views, and to identify the first image object as a mirror reflection of the second image object;
creating a virtual view associated with a virtual camera position, with ODD corresponding to said virtual view comprising a data part of the ODD corresponding to the first view, which data part is associated with the identified first image object;
removing said data part of the ODD associated with the first image object from the first view; and
computing, based on the ODD associated with at least said virtual view of the identified first image object and the first view of the identified second image object, a position of said first image object.

2. The method of claim 1, wherein processing the ODD comprises identifying the first image object based on pre-stored mirror location data in the scene.

3. The method of claim 1, wherein creating the virtual view comprises: transforming the ODD associated with the first image object such that the virtual view is horizontally flipped with respect to the first view.

4. The method of claim 1, wherein processing the ODD comprises:
correlating appearance of a first reference point of the first image object with corresponding appearance of a second reference point of the second image object to identify the first image object as a mirror image of the second image object.

5. The method of claim 1, wherein processing the ODD comprises providing a common object identifier for the first image object and the second image object.

6. The method of claim 1, wherein the computing comprises:
processing of the ODD to generate candidate association data which associates pairs of objects between the views of the scene, wherein the processing further comprises:
computing a plurality of estimated positions in a scene coordinate system of the scene for associated pairs of image objects in the candidate association data;
determining one or more clusters of the plurality of estimated positions;
generating, based on estimated positions in at least one cluster among the one or more clusters, final association data which associates one or more image objects between the views of the scene; and
computing, based on the final association data, one or more final positions in the scene coordinate system of the scene for one or more reference points of said first image object.

7. The method of claim 6, wherein said processing the object detection data to generate candidate association data comprises:
determining a candidate correspondence of said one or more objects between pairs of views among the views of the scene, and wherein the candidate association data associates object identifiers between said pairs of views to represent the candidate correspondence.

8. The method of claim 7, wherein the candidate association data further associates a set of reference points between said pairs of views.

9. The method of claim 6, wherein said determining (204; 308) the one or more clusters comprises:
operating a density-based clustering algorithm on the plurality of estimated positions.

10. The method of claim 6, wherein said generating the final association data comprises:
determining a primary object association between a group of views for said at least one cluster, the primary object association identifying a primary object in each view among the group of views;
computing, based on the primary object association, at least one candidate position in the scene coordinate system of the scene; and
projecting said at least one candidate position onto the group of views to generate at least one projected position on said each view, wherein the final association data is generated based on said at least one projected position on said each view.

11. The method of claim 6, wherein the respective view comprises a two-dimensional digital image, and wherein said location of the respective reference point of the respective object in the respective view is given in a local coordinate system with a fixed relation to the two-dimensional digital image.

12. The method of claim 11, further comprising:
obtaining two-dimensional digital images captured by imaging devices facing the scene; and processing the two-dimensional digital images to generate said object detection data.

13. A monitoring device configured to determine positioning of objects in a scene based on a plurality of views, said monitoring device comprising logic configured to control the monitoring device to:
obtain object detection data, ODD, corresponding to one or more views of the plurality of views of the scene, wherein each of the one or more views is captured by a respective camera, said ODD comprising an object identifier of a respective image object in a respective view and a location of a respective reference point of the respective image object in the respective view;
process the obtained ODD to identify a first image object and a second image object comprised in a first view of said one or more views, and to identify the first image object as a mirror reflection of the second image object object;
create a virtual view associated with a virtual camera position, with ODD corresponding to said virtual view comprising a data part of the ODD corresponding to the first view, which data part is associated with the identified first image object;
remove said data part of the ODD associated with the first image object from the first view; and
compute, based on the ODD associated with at least said virtual view of the identified first image object and the first view of the identified second image object, a position of said first image object.

14. The monitoring device of claim 13, wherein the logic is configured to:
transform the ODD associated with the first image object such that the virtual view is horizontally flipped with respect to the first view.

15. The monitoring device of claim 13, wherein the logic is configured to process the ODD to:
identify the first image object based on prestored mirror location data in the scene.

16. The monitoring device of claim 13, wherein the logic is configured to process the ODD to:
correlate appearance of a first reference point of the first image object with corresponding appearance of a second reference point of the second image object to identify the first image object as a mirror image of the second image object.

17. The monitoring device of claim 13, wherein the logic is configured to process the ODD to:
provide a common object identifier for the first image object and the second image object.

18. The monitoring device of claim 13, wherein to compute comprises to:
process of the ODD to generate candidate association data which associates pairs of objects between the views of the scene,
and wherein to process further comprises to:
compute a plurality of estimated positions in a scene coordinate system of the scene for associated pairs of image objects in the candidate association data;
determine one or more clusters of the plurality of estimated positions;
generate, based on estimated positions in at least one cluster among the one or more clusters, final association data which associates one or more image objects between the views of the scene; and
compute, based on the final association data, one or more final positions in the scene coordinate system of the scene for one or more reference points of said first image object.

* * * * *